United States Patent
Bacik

(10) Patent No.: US 9,075,813 B2
(45) Date of Patent: Jul. 7, 2015

(54) SAVING A SNAPSHOT OF FREE SPACE OF A FILE SYSTEM ON PERSISTENT STORAGE

(75) Inventor: Josef Michael Bacik, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 958 days.

(21) Appl. No.: 13/233,605

(22) Filed: Sep. 15, 2011

(65) Prior Publication Data

US 2013/0073813 A1    Mar. 21, 2013

(51) Int. Cl.
G06F 12/00 (2006.01)
G06F 17/30 (2006.01)
G06F 12/08 (2006.01)

(52) U.S. Cl.
CPC ...... G06F 17/30138 (2013.01); G06F 12/0866 (2013.01); G06F 2212/463 (2013.01); G06F 17/30091 (2013.01)

(58) Field of Classification Search
CPC .......... G06F 17/30581; G06F 17/30138; G06F 12/0866; G06F 17/30091; G06F 2212/463
USPC .......... 711/113, 144, E12.037; 707/822–825
See application file for complete search history.

(56) References Cited

U.S. PATENT DOCUMENTS 8,566,371 B1 * 10/2013 Bono et al. .................... 707/822
2011/0131387 A1   6/2011 Bacik

OTHER PUBLICATIONS

Mason, C. 'Btrfs Design' [online], [retrieved on Sep. 14, 2011], 6 Pages. Retrieved from the Internet <URL: http://oss.oracle.com/-mason/btrfs-design.html>.
Wikipedia [online] 'Btrfs' [retrieved on Sep. 14, 2011], 9 Pages. Retrieved from the Internet <URL: http://en.wikipedia.org/wiki/Btrfs>.
Jones, Tim "Anatomy of the Linux File System". Oct. 30, 2007. 12 Pages. http://www.ibm.com/developerworks/linux/library/l-linux-filesystem/.
Sweetser, Frank—Btrfs "Next Generation Linux Filesystem". Mar. 2010. 42 Pages.
Mason, Chris—The Btrfs Filesystem. Sep. 2007. 28 Pages.
Mason, Chris—"B-Tree File System (Btrfs) or Better-File System (Alias)". Jun. 12, 2007. 8 Pages.
Aurora, Valerie—"A Short History of Btrfs". Jun. 22, 2009. 11 Pages. http://lwn.net/Articles/342892/.

* cited by examiner

*Primary Examiner* — Jasmine Song
(74) *Attorney, Agent, or Firm* — Lowenstein Sandler LLP

(57) ABSTRACT

A mechanism for saving a snapshot of free space of a file system on persistent storage is disclosed. A method of the invention includes determining whether generation numbers stored in each of a free space cache inode of an on-disk free space cache of a block group, a free space cache item, and a free space cache header are valid, determining whether a checksum generated for a first page of the free space cache matches a checksum stored in the file system and associated with the free space cache, and adding entries stored in the on-disk free space cache to an in-memory free space cache for the block group kept in volatile memory of a computing device, wherein the on-disk free space cache is stored in persistent data storage indexed by a file system of the computing device.

20 Claims, 4 Drawing Sheets

SAVING A SNAPSHOT OF FREE SPACE OF A FILE SYSTEM ON PERSISTENT STORAGE

TECHNICAL FIELD

The embodiments of the invention relate generally to file systems and, more specifically, relate to a mechanism for saving a snapshot of free space of a file system on persistent storage.

BACKGROUND

Currently, a variety of file system structures exist in the computing environment. One such file system structure is the B-tree file system (BTRFS), which is a GPL-licensed copy-on-write (COW) file system for Linux™. In a BRTFS, everything in the file system, such as inodes, file data, directory entries, and so on, is an 'item' in a COW B+tree. BTRFS is structured as several layers of trees, all using the same b-tree implementation to store their various data types as generic 'items' sorted on a 'key' that specifies an object id and an item type, so that BTRFS is data agnostic. An 'item' is a data structure used in BTRFS which includes a combination of a 'key' data structure (where to find the item itself), a type of the item, and an offset where the data referenced by the item can be found. 'Items' are packed together (or pushed out to leaves) in arrangements that optimize both access time and disk space. In most cases in BTRFS, 'items' for the same object end up adjacent to each other in the tree, ordered by type.

Moreover, BTRFS provides extent-based file storage. An extent is a contiguous area of storage. In BTRFS, extents are zoned into block groups, which default to 4 KB in size and contain only file data. Each node and leaf of the BTRFS is an extent in the b-tree. Nodes are extents full of <key, block header> pairs, and leaves contain 'items'. The extents for large file data are kept outside the BTRFS b-tree, with an extent 'item' in the leaf describing the extent where the large file data is kept. Small files that occupy less than one leaf block may be packed into the b-tree itself, inside of the extent 'item.'

An extent allocation tree (also called an extent tree) is used to track space usage by extents and manage allocated space on the extent trees in the BTRFS. The space available can be divided between a number of extent trees and reduce lock contention and give different allocation policies to different block ranges.

When mounting a file system, such as a BTRFS, a free space cache is typically generated in memory to keep track of the free space available in the file system. When an application running on the computer system needs disk space, it requests a region of specified size from the file system included in the computer system. The file system manages unallocated storage space, and may use a data structure stored in primary memory (e.g., random access memory (RAM)) to determine what storage space to allocate to the application to satisfy the request. Various data structure may be used to represent the free space available in the file system. For instance, an extent may be used to represent the offset and the length of free space available in a block group. Additionally, a bitmap may also be used, which utilizes bits to represent whether particular page blocks are free or not.

However, in typical file systems, generating such a free space data structure in memory is a very intensive process. Typically, to generate a free space cache, the extent allocation tree is referenced to determine what is free in each block group of the file system. To do this, the extent allocation tree must be walked to read all of the extent block groups and determine what space is free in the block group. This means that many blocks (e.g., in the order of thousands) in the memory structure need to be searched, which can be time-consuming and inefficient, resulting in performance slow-downs.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
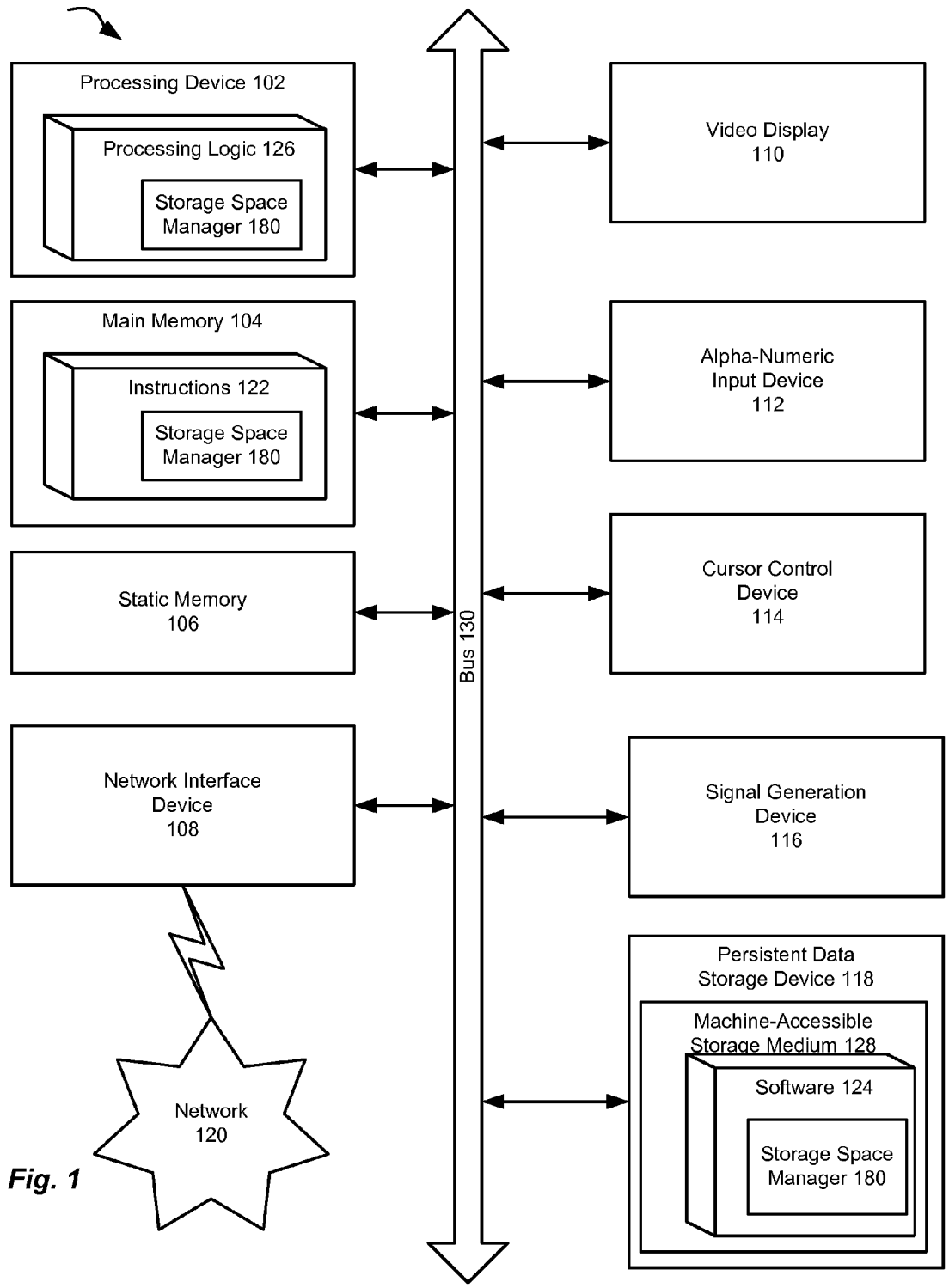
FIG. 1 illustrates a block diagram of one embodiment of a computer system implementing a file system to save a snapshot of free space in a file system on persistent storage.

Embodiments of the invention provide for a mechanism for saving a snapshot of free space of a file system on persistent storage. A method of embodiments of the invention includes determining whether generation numbers stored in each of a free space cache inode of an on-disk free space cache of a block group, a free space cache item, and a free space cache header are valid, determining whether a checksum generated for a first page of the free space cache matches a checksum stored in the file system and associated with the free space cache, and adding entries stored in the on-disk free space cache to an in-memory free space cache for the block group kept in volatile memory of a computing device, wherein the on-disk free space cache is stored in persistent data storage indexed by a file system of the computing device.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "adding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide a mechanism for saving a snapshot of free space of a file system on persistent storage. Specifically, in the file systems of various operating systems (OSs), structures are held in memory to keep track of free space. The generation process for this free space cache is very intensive, resulting in performance slow downs. Embodiments of the invention use a special inode in each block group, a free space item, and a free space cache header, so that only a few blocks need to be read to generate a complete free space cache, instead of searching thousands of blocks to generate the cache.

FIG. 1 illustrates a diagrammatic representation of a machine in the exemplary form of a computer system 100 within which a set of instructions, for causing the machine to perform any one or more of the methodologies discussed herein below, may be executed. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 100 includes a processing device 102, a main memory 104 (e.g., read-only memory (ROM), flash memory, dynamic random access memory (DRAM) such as synchronous DRAM (SDRAM) or Rambus DRAM (RDRAM), etc.), a static memory 106 (e.g., flash memory, static random access memory (SRAM), etc.), and a persistent data storage device 118 (e.g., hard disk drive, optical drive, etc.), which communicate with each other via a bus 130.

The processing device 102 represents one or more general-purpose processing devices such as a microprocessor, central processing unit, or the like. More particularly, the processing device 102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 102 may also be one or more special-purpose processing devices such as an application specific integrated circuit (ASIC), a field programmable gate array (FPGA), a digital signal processor (DSP), network processor, or the like. The processing device 102 is configured to execute the processing logic 126 for performing the operations and steps discussed herein below.

The computer system 100 may further include a network interface device 108. The computer system 100 also may include a video display unit 110 (e.g., a liquid crystal display (LCD) or a cathode ray tube (CRT)), an alphanumeric input device 112 (e.g., a keyboard), a cursor control device 114 (e.g., a mouse), and a signal generation device 116 (e.g., a speaker).

The persistent data storage device 118 may include a machine-accessible storage medium 128 on which is stored software 124 embodying any one or more of the methodologies or functions described herein. For example, software 124 may store instructions for a storage space manager 180 to perform saving a snapshot of free space of a file system on persistent data storage. The software 124 may also reside, completely or at least partially, within the main memory 104 and/or within the processing device 102 during execution thereof by the computer system 100. In addition, the main memory 104 and the processing device 102 also constituting machine-accessible storage media. The machine-readable storage medium 128 may also be used to store instructions to perform saving a snapshot of free space of a file system on persistent data storage device 118, and/or a software library containing methods that call the above applications.

In one embodiment of the present invention, at least a portion of the persistent data storage device 118 is managed memory. Managed memory is allocated and deallocated according to the needs of one or more applications (programs) and/or an operating system (OS). Means for managing portions of persistent data storage device 118 may be implemented in hardware, software, or a combination thereof. In one embodiment, the means for managing persistent data storage device 118 is a storage space manager (SSM) 180 that may be included in a file system. The storage space manager 180 may be responsible for assigning (allocating) and freeing (deallocating) portions of persistent data storage device 118, and/or for making calls to the general purpose memory allocation library that do so. One embodiment of the storage space manager is discussed in more detail in conjunction with FIG. 2. The storage space manager 180 may be included in one or more of the processing logic 126, main memory 104, or persistent data storage device 118.

While persistent data storage device 118 and main memory 104 are each shown in an exemplary embodiment to be single mediums, each should be taken to include a single medium or multiple media (e.g., a centralized or distributed database, and/or associated caches, registers, etc.) that store the one or more sets of instructions.

Each of the main memory 104 and the persistent data storage device 118 may include a machine accessible storage medium, which shall be taken to include any medium that is capable of storing or encoding a set of instructions 122 or software 124 for execution by the machine and that cause the machine to perform any one or more of the methodologies of the present invention. The term "machine-accessible storage medium" shall accordingly be taken to include, but not be limited to, solid-state memories and optical and magnetic media.

Figure 2:
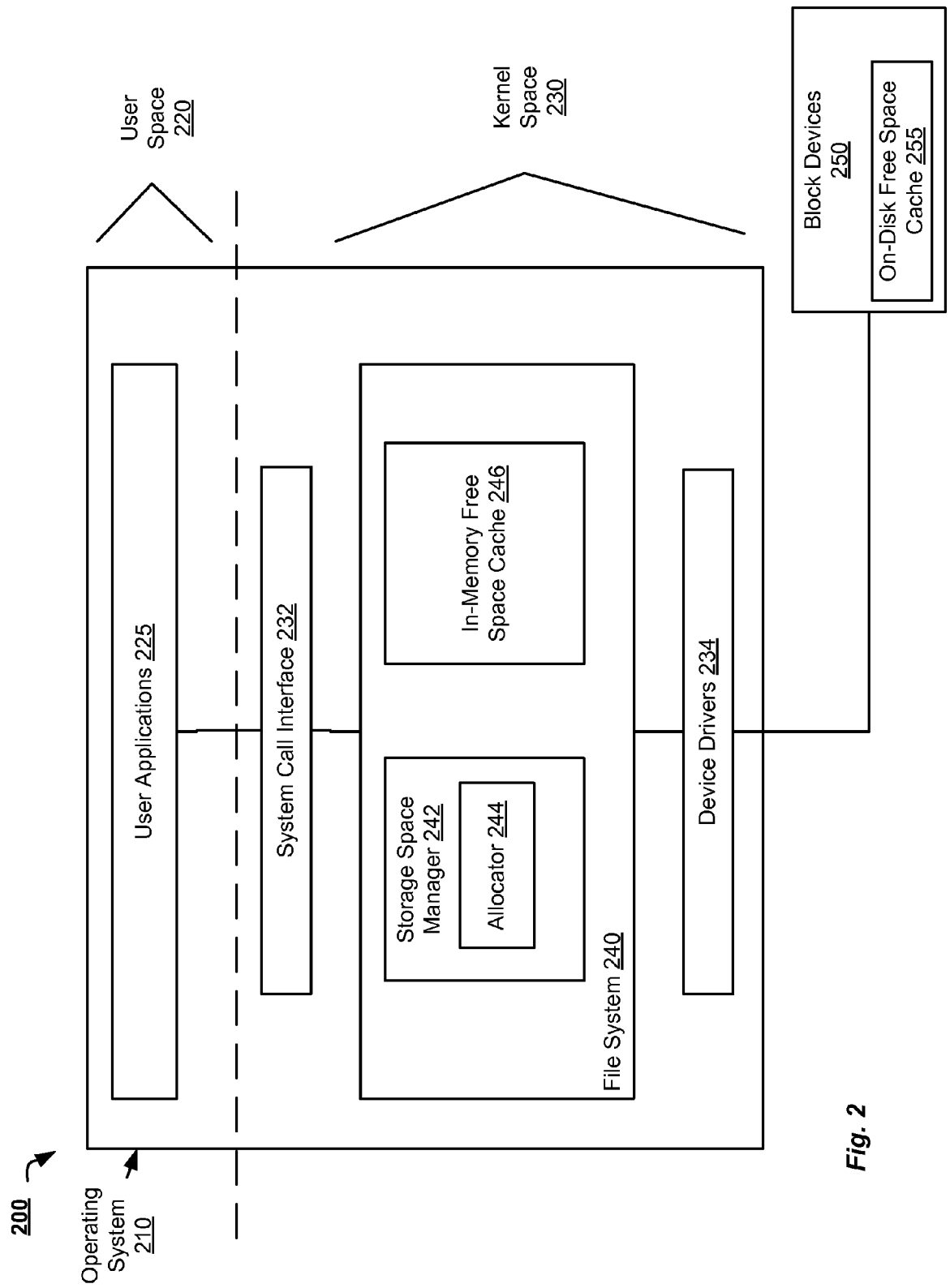
FIG. 2 is a block diagram of one embodiment of a file system environment 200 that performs saving a snapshot of free space of a file system on persistent data storage.

FIG. 2 illustrates a block diagram of one embodiment of a file system environment 200 that performs saving a snapshot of free space of a file system on persistent data storage. More specifically, FIG. 2 illustrates the major file system components implemented in an operating system (OS) 210 for use in saving a snapshot of free space of a file system on persistent data storage in embodiments of the invention. Note that though the following description refers to a file system, embodiments of the present invention can also be used to manage unallocated storage space in a database management system.

In one embodiment, file system environment 200 includes an OS 210 communicably coupled to one or more block devices 250. In one embodiment, OS 210 is executing on processing device 102 described with respect to FIG. 1. Furthermore, in one embodiment, block devices 250 are the same as persistent data storage device 118 described with respect to FIG. 1.

As shown in FIG. 2, OS 210 is divided into user space 220 and kernel space 230. User space 220 contains the applications 225 that provide the user interface for file system calls (e.g., open, read, write, close). Kernel space 230 contains the components that receive and implement the logic to response to the file system calls from the user space 220.

In particular, kernel space 230 includes a system call interface 232 that acts as a switch to funnel file system calls from user space 220 to the appropriate endpoints in kernel space 230. One such endpoint is the file system 240, which implements an individual file system, such as BTRFS, ext3/4, JFS, and so on. The file system 240 manipulates the one or more block devices 250 with read and write requests and other administrative tasks. The device drivers 234 provide the interface between the kernel space 230 components and the one or more block devices 250, allowing them to interact.

In embodiments of the invention, file system 240 includes a storage space manager 242 to perform saving a snapshot of free space of a file system on persistent data storage. The storage space manager 210 may be implemented in hardware, software, or a combination thereof. In one embodiment, storage space manager 242 is the same as storage space manager 180 described with respect to FIG. 1, and manages at least portions of the persistent data storage device 118 of FIG. 1.

In one embodiment, storage space manager 242 includes an allocator 244 that is responsible for assigning (allocating) and freeing (deallocating) regions of storage space in block devices 250, and/or for making calls to a general purpose memory allocation library that do so. The storage space manager 210 conceptually divides storage space in block devices 250 into multiple block groups, and generates a separate search tree for managing each block group. Each search tree may be maintained in main memory of the computing device implementing the OS 210, such as main memory 104 described with respect to FIG. 1.

Storage space is typically divided into fixed size blocks, which are sequences of bytes or bits. A block may be the smallest unit of storage space that is allocated/managed. Typical block sizes include 1 kb, 2 kb, 4 kb and 8 kb. A block group is a sequence of blocks, and is also known as an extent. In some file systems, such as BTRFS, extents are zoned into block groups, which default to 4 KB in size and contain only file data.

Using the example of BTRFS, each node and leaf is an extent in a b-tree. Nodes are extents full of <key, block header> pairs, and leaves contain 'items'. The extents for large file data are kept outside the BTRFS b-tree, with an extent 'item' in the leaf describing the extent where the large file data is kept. Small files that occupy less than one leaf block may be packed into the b-tree itself, inside of the extent 'item.'

In some embodiments, allocator 244 may utilize an extent allocation tree (also called an extent tree) to track space usage by extents and manage allocated space on the extent trees. The space available can be divided between a number of extent trees and reduce lock contention and give different allocation policies to different block ranges.

In one embodiment, when the file system 240 is first mounted (i.e. associating the file system 240 to the storage device 250), storage space manager 242 generates an in-memory free space cache 246 to keep track of the free space available in the file system. For example, the in-memory free space cache 246 may be stored in main memory 104 described with respect to FIG. 1. When an application running on OS 210 needs disk space, it requests a region of specified size from the file system 240. The storage space manager 242 will then utilize the in-memory free space cache 246 to determine what storage space from block devices 250 to allocate to the application to satisfy the request.

Various data structure may be used to represent the free space available in the file system. For instance, an extent may be used to represent the offset and the length of free space available in a block group. Additionally, a bitmap may also be used, which utilizes bits to represent whether particular page blocks are free or not.

The typical way to generate the in-memory free space cache 246 can be a very intensive and time-consuming process because it requires the storage space manager 242 to perform a full walk of the extent allocation tree to read all of the extent block groups and determine what space is free in each block group. This means that many blocks (e.g., in the order of thousands) in the memory structure need to be searched, which can be time-consuming and inefficient, resulting in performance slowdowns.

Embodiments of the invention introduce an on-disk free space cache 255 to be stored in the persistent data storage of block devices 250 in order to speed up the generation process for the in-memory free space cache 246. Using the on-disk free space cache 255, storage space manager 242 will only have to read a few blocks from the on-disk free space cache 255, instead of thousands of blocks from the extent allocation tree, in order to generate the in-memory free space cache.

In embodiments of the invention, three data structures are introduced for each block group of the file system in order to support the implementation of the on-disk free space cache 255: (1) a special inode for the block group's free space cache, (2) a free space cache item for the block group, and (3) a header that begins the block group's free space cache. These items are described in further detail below while describing how the on-disk free space cache 255 is implemented by storage space manager 242.

When a file system 240 is first mounted by operating system 210, the on-disk free space cache 255 does not exist. However, it is at this time that the in-memory free space cache 246 is created by the storage space manager 242 in the memory space of the computing device (e.g., RAM, etc.). At the initial mounting time, the in-memory free space cache 246 is created using the current technique of walking the entirety of the extent allocation tree to determine free space in the storage of the file system.

In embodiments of the invention, the on-disk free space cache 255 is created/written out to disk (i.e. persistent data storage) upon each transaction commit operation by the file system 240. The on-disk free space cache 255 is only written out to disk for those block groups that have modifications reflected in the transaction commit being written out.

In order to create the on-disk free space cache for a block group, a special free space cache inode is created by storage space manager 242 for the particular block group. In one embodiment, this free space cache inode may be kept in a root tree of the file system 140. This free space cache inode will point to the space on-disk where the on-disk free space cache for the block group is stored. This free space cache inode will carry a generation number that will match the transaction that is being committed. This generation number is used for verification and validity purposes. The generation number is also stored in the file system's superblock for comparison purposes. In addition, the free space cache inode for a block group will contain a pointer to space on disk where the block group's free space cache is stored.

In addition, a free space cache 'item' is created by storage space manager 242 for the particular block group. The free space cache item holds the basic information about the block group's stored free space cache. In one embodiment, this free space cache item may be kept in a root tree of the file system 140 along with the free space cache inode. The free space cache item for the block group will hold the generation number of the transaction to make sure it matches the block group's free space cache inode. The free space cache item will also hold the number of entries that are contained within the free space cache and the number of bitmaps in the free space cache.

Lastly, at the front of the first page of the free space cache (on disk) for the block group is a header. The header includes a generation number of the transaction that is currently being written. In some embodiments, the header may also include a list of checksums for all of the pages in the free space cache on disk. However, in other embodiments, the checksums for the block group may be stored elsewhere, such as in an internal checksum saving infrastructure, and not necessarily in the header.

In one embodiment, when writing out the block group's on-disk free space cache, three things are written: (1) type of entry (i.e., whether it is an extent or a bitmap); (2) physical on-disk offset of the entry; and (3) physical on-disk size of the entry. If the entry is a bitmap, the bitmaps are written after all of the entries have been written, in the order they appear in the cache, so they can be read back in the proper order.

As a result, the on-disk free space cache 255 for a block group may look like the following:
[ ]—Different blocks
|—Logical Separator
H—Header
EE—Extent Entry
BE—Bitmap Entry
B—Bitmap
[H|EE1|BE1] [EE2|EE3|BE2|EE4] [B1] [B2]
This on-disk free space cache 255 may be referenced by an associated free space cache inode and an associated free space cache item in the file system 240.

In addition to writing out and creating the on-disk free space cache 255 for each block group, the in-memory free space cache 246 may also updated upon each transaction commit that writes out to the on-disk free space cache 255. It is at this time that the changes being written out to the on-disk free space cache 255 may be reflected in the in-memory free space cache 246.

In embodiments of the invention, the in-memory free space cache 246 essentially has the same structure that the new on-disk free space cache 255 has. The in memory free space cache 246 is a tree of entries of either extent type (offset and length) or a bitmap (a page of memory where every bit that is set to 1 represents one block of free space). As previously mentioned, when writing the on-disk free space cache 255 out to the block devices 250, all of the entries are written out with a type and then at the end any bitmaps are written out. As a result, the in-memory free space cache 246 may look like this, for example:

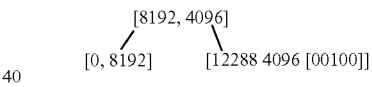

and then the associated on-disk free space cache 255 would similarly look like this, for example:
|0,8192,extent|8192,4096,extent|12288,4096,bitmap|00100|

When the computing device implementing the file system 240 shuts down, the in-memory free space cache 246 may be cleared. This is when the on-disk free space cache 255 of embodiments of the invention can be used to speed up the in-memory free space cache generation 246 upon re-boot of the computing device. Upon re-start/re-boot of the computing device, any of the previously-created on-disk free space caches 255 can be read from to create the in-memory free space cache 246. If a block group does not yet have an on-disk free space cache associated with it, then the in-memory free space cache 246 for that block group can be created using pervious techniques (e.g., walking the extent tree).

Figure 3:
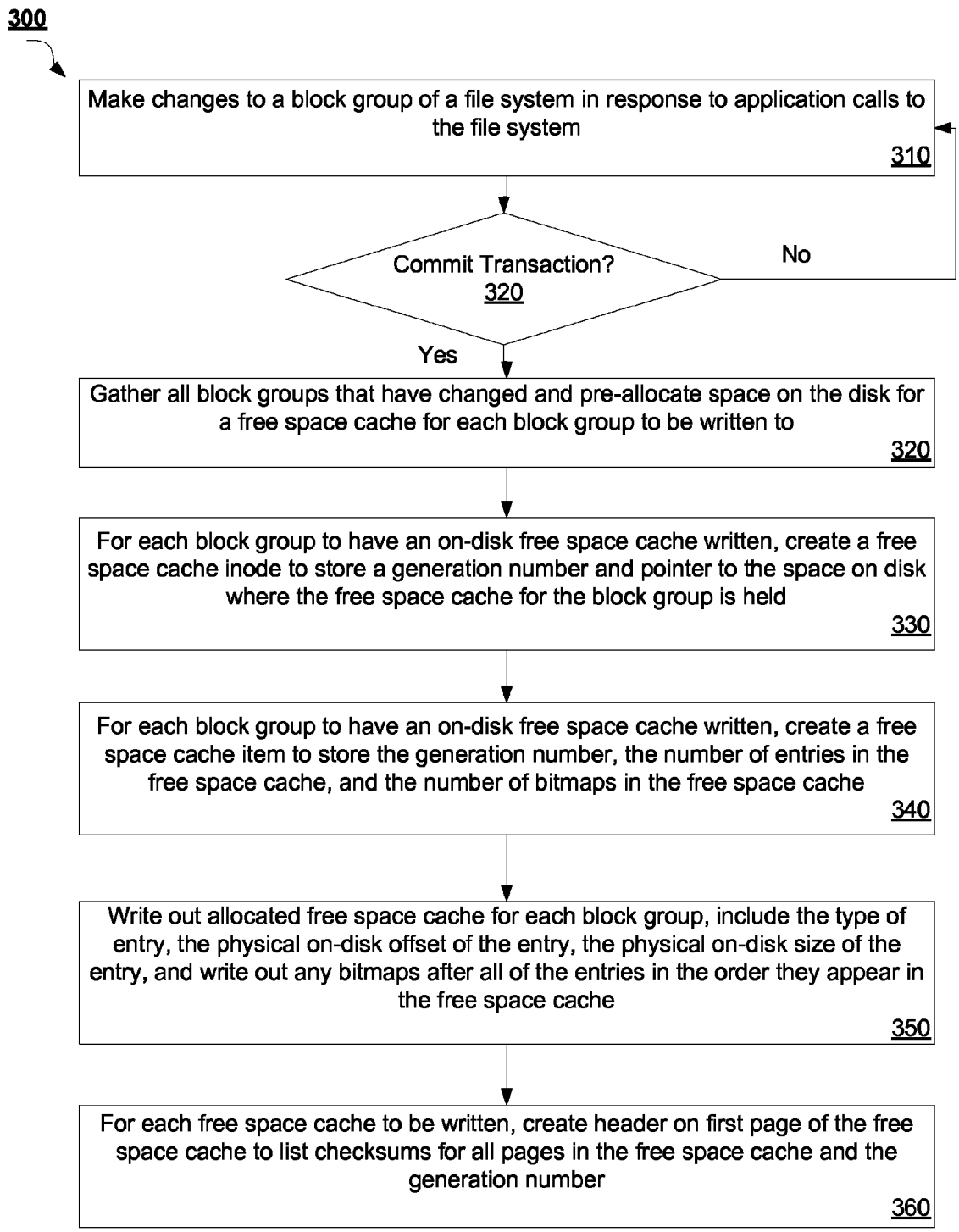
FIG. 3 is a flow diagram illustrating a method for creating an on-disk free space cache that is used for saving a snapshot of free space of a file system on persistent storage according to an embodiment of the invention.

FIG. 3 is a flow diagram illustrating a method 300 for creating an on-disk free space cache that is used for saving a snapshot of free space of a file system on persistent storage according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by storage space manager 180 of FIG. 1.

Method 300 begins at block 310 where changes are made to one or more block groups of a file system. In one embodiment, the changes may be made in response to application calls received at the file system. At decision block 320, it is determined whether a transaction is to be committed to the persistent data storage device of the file system. In other words, based on protocols of the particular implemented file system it is determined whether any changes made to the block group should be written to the persistent data storage device indexed by the file system. If not, then method 300 returns to block 310 to continue making changes to one or more block groups.

If a transaction is to be committed at decision block 310, then method 300 continues to block 330 where all block groups that have been changed are gathered and space in the persistent data storage device is pre-allocated for an on-disk free space cache for each block group with changes. If a free space cache for a block group already exists in on-disk, then space is not pre-allocated for that block group.

Then, at block 330, for each block group to have an on-disk free space cache, a free space cache inode is created to store a generation number corresponding to the transaction id of the transaction being written. In addition, the free space cache inode for each block group includes a pointer to the space on disk (i.e., persistent data storage device) where the free space cache for the block group is held. In one embodiment, the free space cache inode for each block group is kept in the root tree (sometimes called the tree of tree roots) of the file system. If a free space cache inode already exists for a particular block group, then the generation number should just be updated.

Subsequently, at block 340, for each block group to have an on-disk free space cache, a free space cache item is created to store the generation number, the number of entries in the free space cache, and the number of bitmaps in the free space cache. If a free space cache item already exists for a particular block group, then the generation number should be updated as well as the number of entries and bitmaps.

At block 350, the allocated free space cache on-disk for each block group is written out. When writing out a free space cache for a block group, three things are included: (1) the type of entry (e.g., extent or bitmap), (2) the physical on-disk offset of the entry, and (3) the physical on-disk size of the entry. Once all the entries are written out, any bitmaps are written out in the order they appear in the entries in the free space cache. At block 360, a header is created on the first page of each free space cache written to. The free space cache header lists checksums for all of the pages in the free space cache as well as the generation number. If a free space cache already exists, then in block 350 and 360, the free space cache is updated with the new information accordingly with updated entries, new checksums, and a new generation number.

Figure 4:
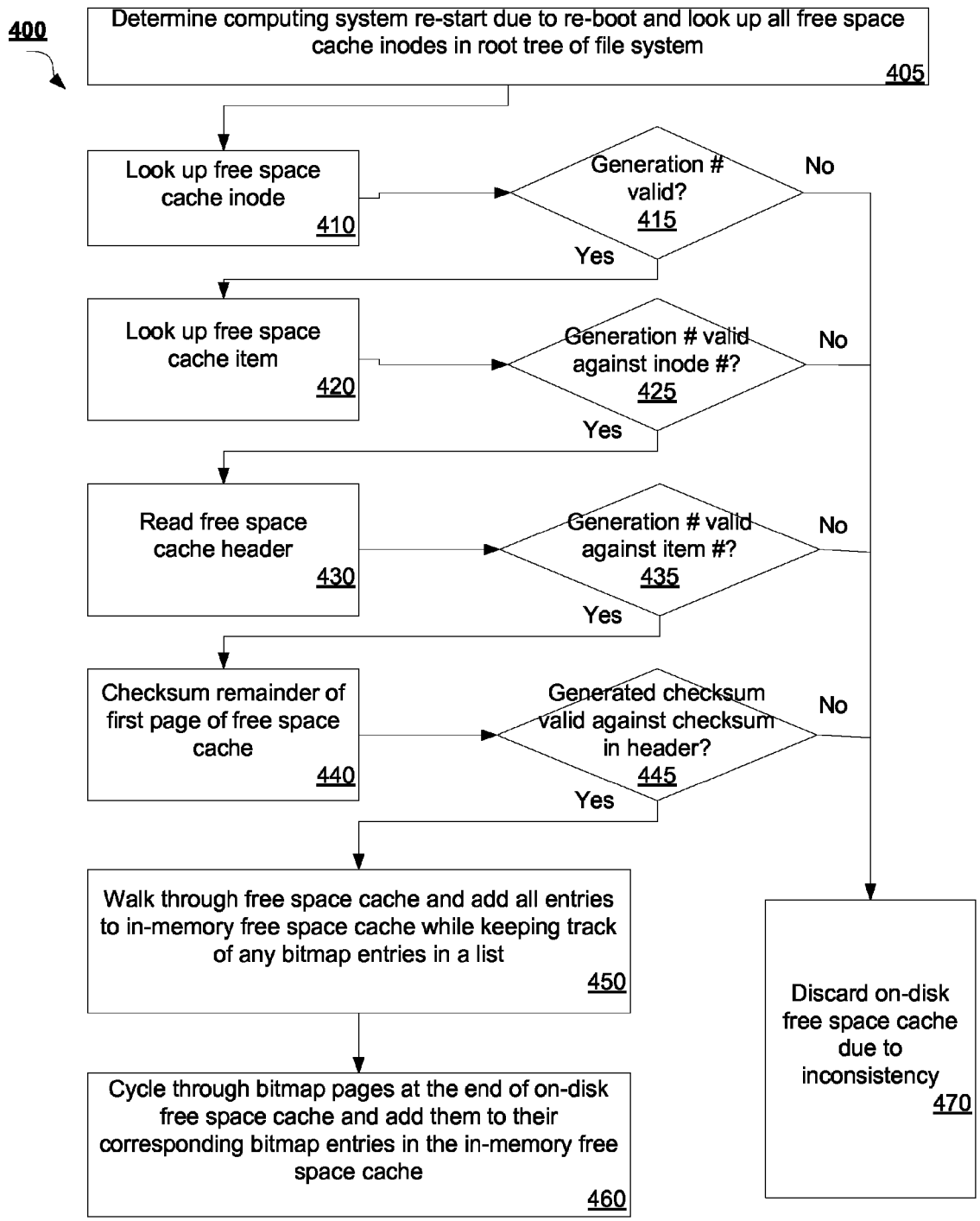
FIG. 4 is a flow diagram illustrating a method for creating an in-memory free space cache for a file system upon re-boot of a computer system by utilizing an on-disk free space cache on persistent storage indexed by the file system according to an embodiment of the invention.

FIG. 4 is a flow diagram illustrating a method 400 for creating an in-memory free space cache for a file system upon re-boot of a computer system by utilizing an on-disk free space cache on persistent storage indexed by the file system according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by storage space manager 180 of FIG. 1.

Method 400 begins at block 405 where it is determined by the file system, and in particular, the storage space manager, that the computing system of the file system is re-starting due to a re-boot. As a result, the storage space manager creates an in-memory free space cache from the corresponding on-disk free space cache in the persistent data storage device. The storage space manager starts by looking up all of the free space cache inodes in the root tree of the file system. For the following steps 410 through 470, one skilled in the art will appreciate that the steps 410-470 may be run on a per block group basis, or can be run against all block groups at once (i.e., in series or in parallel).

At block 410, a free space cache inode is examined and a generation number is pulled from the inode. At decision block 415, it is determined whether the generation number is valid. In one embodiment, the generation number from the inode may be compared against a generation number in the superblock of the file system. If the generation number is not valid, then method 400 ends at block 470 where the on-disk free space cache is discarded due to inconsistency. On the other hand, if the generation number is valid, then method 400 continues to block 420.

At block 420, the free space cache item associated with the block group having the free space cache inode is looked up and a generation number is pulled from the item. At decision block 425, it is determined whether the generation number is valid by comparing it against the generation number from the free space cache inode. If the generation number is not valid, then method 400 ends at block 470 where the on-disk free space cache is discarded due to inconsistency. On the other hand, if the generation number is valid, then method 400 continues to block 430.

At block 430, the header of the free space cache of the block group having the free space cache inode and item is read. At decision block 435, a generation number from the header stored is compared to the free space cache item's generation number to determine if it is valid. If the generation number is not valid, then method 400 ends at block 470 where the on-disk free space cache is discarded due to inconsistency. On the other hand, if the generation number is valid, then method 400 continues to block 440.

At block 440, a checksum of the remainder of the first page (not including header) of the free space cache is generated. At decision block 445, this checksum is compared to a checksum kept in the header of the free space cache for validity. If the checksum is not valid, then method 400 ends at block 470 where the on-disk free space cache is discarded due to inconsistency. On the other hand, if the checksum is valid, then method 400 continues to block 450.

At block 450, the free space cache is walked-through and all entries in the free space cache are added to an in-memory free space cache for the block group. In addition, any bitmap entries are noted in a separate list. Subsequently, at block 460, once all of the entries are written to the in-memory free space cache, the bitmap pages at the end of the on-disk free space cache are cycled through and added to their corresponding bitmap entries in the in-memory free space cache. These steps are repeated for each block group in the file system having an on-disk free space cache. As a result, an in-memory free space cache can be created in a quicker and more efficient manner. Instead of reading thousands of blocks from an extent tree, just a few blocks need to be read from the on-disk free space cache.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   determining, by a processing device of a computing device, that a free space cache inode generation number stored in a free space cache inode of an on-disk free space cache of a block group is valid, wherein the on-disk free space cache is stored in persistent data storage indexed by a file system of the computing device;
   determining, by the processing device in view of determining that the free space cache inode generation number is valid, that a free space cache item generation number stored in a free space cache item of the on-disk free space cache is valid by comparing the free space cache item generation number to the free space cache inode generation number;
   determining, by the processing device in view of determining that the free space cache item generation number is valid, that a free space cache header generation number stored in a free space cache header of the on-disk free space cache is valid by comparing the free space cache header generation number to the free space cache item generation number;
   determining, by the processing device in view of determining that the free space cache header generation number is valid, that a checksum generated for a first page of the on-disk free space cache matches a stored checksum corresponding to the on-disk free space cache, wherein the stored checksum is stored in the file system; and
   adding, by the processing device, entries stored in the on-disk free space cache to an in-memory free space cache for the block group stored in volatile memory of the computing device.

2. The method of claim 1, wherein determining whether the free space cache inode generation number is valid further comprises comparing the free space cache inode generation number to a generation number stored in a superblock of the file system.

3. The method of claim 1, wherein the entries comprise at least one of one or more extents representing free space in the file system or one or more bitmaps representing free space in the file system.

4. The method of claim 1, wherein the in-memory free space cache for the block group is generated upon start-up of the computing device.

5. The method of claim 1, wherein if any of the free space cache inode generation number, the free space cache item generation number, or the free space cache header generation number are not valid, then the method further comprises discarding the on-disk free space cache for the block group as inconsistent.

6. The method of claim 1, wherein the persistent storage device comprises a plurality of block groups comprising the block group and wherein the method further comprises repeating each of the determining steps and the adding step for each block group in the plurality of block groups having an on-disk free space cache associated with it.

7. The method of claim 1, wherein the on-disk free space cache is written to the persistent storage device after the file system has been mounted to the computing device and a transaction commit has been performed for the block group.

8. The method of claim 1, wherein the file system is a B-tree file system (BTRFS).

9. A system, comprising:
   a processing device;
   a main memory communicably to the processing device;
   a persistent data storage device communicably coupled to the processing device and the main memory; and
   a storage space manager executed by the processing device to manage a file system that indexes data stored in the persistent data storage device, the storage space manager to:
      determine that a free space cache inode generation number stored in a free space cache inode of an on-disk free space cache of a block group is valid, wherein the on-disk free space cache is stored in the persistent data storage and associated with the file system;
      determine, in view of determining that the free space cache inode generation number is valid, that a free space cache item generation number stored in a free space cache item of the on-disk free space cache is valid by comparing the free space cache item generation number to the free space cache inode generation number;
      determine, in view of determining that the free space cache item generation number is valid, that a free space cache header generation number stored in a free space cache header of the on-disk free space cache is valid by comparing the free space cache header generation number to the free space cache item generation number;
      determine, in view of determining that the free space cache header generation number is valid, that a checksum generated for a first page of the on-disk free space cache matches a stored checksum corresponding to the on-disk free space cache, wherein the stored checksum is stored in the file system; and
      add entries stored in the on-disk free space cache to an in-memory free space cache for the block group stored in volatile memory of the computing device.

10. The system of claim 9, wherein the determining whether the free space cache inode generation number is valid further comprises comparing the free space cache inode generation number to a generation number stored in a superblock of the file system.

11. The system of claim 9, wherein the entries comprise at least one of one or more extents representing free space in the file system or one or more bitmaps representing free space in the file system.

12. The system of claim 9, wherein if any of the free space cache inode generation number, the free space cache item generation number, or the free space cache header generation number are not valid, then the storage space manager further configured to discard the on-disk free space cache for the block group as inconsistent.

13. The system of claim 9, wherein the persistent data storage device comprises a plurality of block groups comprising the block group and wherein the storage space manager further configured to repeat each of the determining steps and the adding step for each block group in the plurality of block groups having an on-disk free space cache associated with it.

14. The system of claim 9, wherein the on-disk free space cache is written to the persistent data storage device after the file system has been mounted to the system and a transaction commit has been performed for the block group.

15. The system of claim 9, wherein the file system is a B-tree file system (BTRFS).

16. A non-transitory machine-readable storage medium including instructions that, when accessed by a processing device, cause the processing device to:
   determine, by the processing device of a computing device, that a free space cache inode generation number stored in a free space cache inode of an on-disk free space cache of a block group is valid, wherein the on-disk free space cache is stored in persistent data storage indexed by a file system of the computing device;

determine, by the processing device in view of determining that the free space cache inode generation number is valid, that a free space cache item generation number stored in a free space cache item of the on-disk free space cache is valid by comparing the free space cache item generation number to the free space cache inode generation number;

determine, by the processing device in view of determining that the free space cache item generation number is valid, that a free space cache header generation number stored in a free space cache header of the on-disk free space cache is valid by comparing the free space cache header generation number to the free space cache item generation number;

determine, by the processing device in view of determining that the free space cache header generation number is valid, that a checksum generated for a first page of the on-disk free space cache matches a stored checksum corresponding to the on-disk free space cache, wherein the stored checksum is stored in the file system; and add, by the processing device, entries stored in the on-disk free space cache to an in-memory free space cache for the block group stored in volatile memory of the computing device.

17. The non-transitory machine-readable storage medium of claim 16, wherein determining whether the free space cache inode generation number is valid further comprises comparing the free space cache inode generation number to a generation number stored in a superblock of the file system.

18. The non-transitory machine-readable storage medium of claim 16, wherein the entries comprise at least one of one or more extents representing free space in the file system or one or more bitmaps representing free space in the file system.

19. The non-transitory machine-readable storage medium of claim 16, wherein when any of the free space cache inode generation number, the free space cache item generation number, or the free space cache header generation number are not valid, the processing device further to discard the on-disk free space cache for the block group as inconsistent.

20. The non-transitory machine-readable storage medium of claim 16, wherein the file system is a B-tree file system (BTRFS).

* * * * *